United States Patent

Tuckey

[11] Patent Number: 5,793,140
[45] Date of Patent: Aug. 11, 1998

[54] ELECTRIC MOTOR FLAT COMMUTATOR

[75] Inventor: J. D. Tuckey, Cass City, Mich.

[73] Assignee: Walbro Corporation, Cass City, Mich.

[21] Appl. No.: 574,727

[22] Filed: Dec. 19, 1995

[51] Int. Cl.$^6$ .................................. H01R 39/06
[52] U.S. Cl. .................. 310/237; 310/233; 310/236; 310/67 R; 310/44; 310/45
[58] Field of Search .................. 310/237, 233, 310/236; 29/597

[56] References Cited

U.S. PATENT DOCUMENTS

| | | | |
|---|---|---|---|
| 4,453,102 | 6/1984 | Sawabe et al. | 310/237 |
| 4,596,519 | 6/1986 | Tuckey | 418/15 |
| 4,948,346 | 8/1990 | Tuckey | 417/312 |
| 5,013,221 | 5/1991 | Tuckey | 417/365 |
| 5,157,299 | 10/1992 | Gerlach | 310/237 |
| 5,175,463 | 12/1992 | Farago et al. | 310/237 |
| 5,245,240 | 9/1993 | Takasaki | 310/237 |
| 5,255,426 | 10/1993 | Farago et al. | 29/597 |
| 5,400,496 | 3/1995 | Kemmer et al. | 29/597 |
| 5,442,849 | 8/1995 | Strobl | 29/597 |
| 5,530,311 | 6/1996 | Ziegler | 310/237 |
| 5,552,652 | 9/1996 | Shimoyama et al. | 310/237 |

Primary Examiner—Steven L. Stephan
Assistant Examiner—Elvin G. Enad
Attorney, Agent, or Firm—Barnes, Kisselle, Raisch, Choate, Whittemore & Hulbert, P.C.

[57] ABSTRACT

A flat commutator for an electric motor of a vehicle fuel pump. The commutator is made with a one-piece carbon ring having a flat outer face, a one-piece conductor ring with a base portion embedded in the carbon ring and underlying outer face, and a housing of a plastic insulating material molded on the rear face of the carbon ring and adapted to mount the commutator on a motor armature. A plurality of circumferentially spaced apart grooves extend radially and axially completely through both the carbon ring and the conductor ring to provide a plurality of individual sintered carbon segments each with a separate conductor for electrically connecting the segments with armature coils.

15 Claims, 3 Drawing Sheets

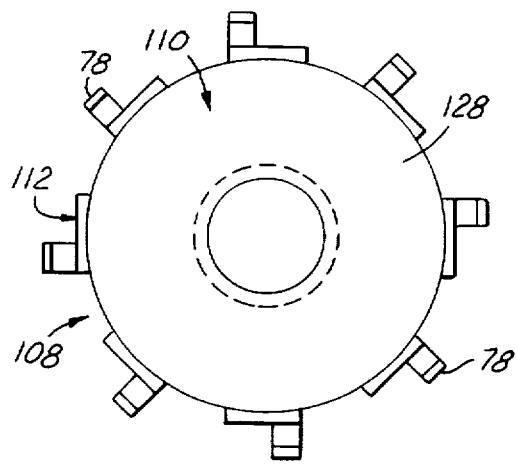
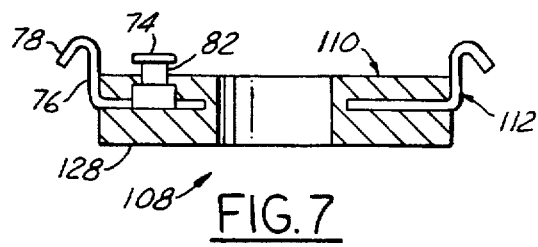
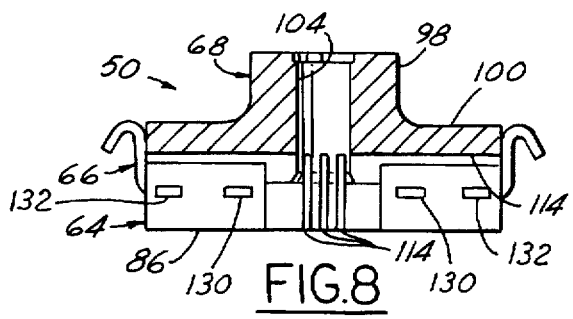
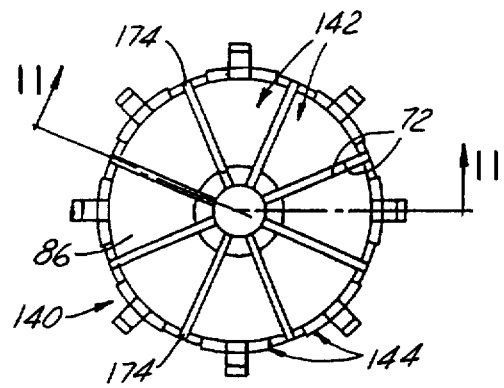
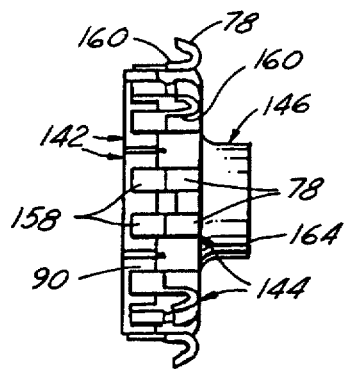
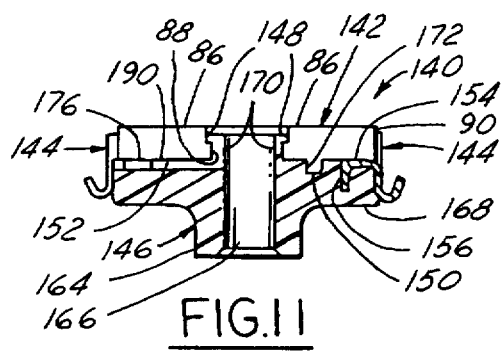
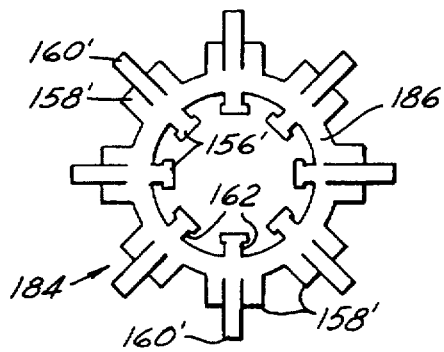

ELECTRIC MOTOR FLAT COMMUTATOR

FIELD OF THE INVENTION

This invention relates to electric motors, and more particularly to a flat commutator for an electric motor of a fuel pump, which is immersed in fuel, and a method of making it.

BACKGROUND OF THE INVENTION

Electric fuel pumps disposed in a fuel tank of an automotive vehicle with a motor armature and commutator in contact with liquid fuel have been previously used. One such fuel pump with an electric motor having a flat commutator perpendicular to the axis of rotation of the armature and with brushes generally parallel to the armature is disclosed in U.S. Pat. No. 5,013,221 issued on May 7, 1991.

Various flat commutator constructions and methods of making them have been previously used. U.S. Pat. No. 5,157,299 issued on Oct. 20, 1992 discloses a method and commutator in which circumferentially spaced apart separate carbon segments and underlying metal conductor/supports are received on a hub of a molded insulating plastic material with the plastic material received between the confronting side edges of adjacent metal conductor/supports to protect them from contact with liquid fuel which results in corrosion of the metal conductor/supports and degradation of the commutator when in service.

SUMMARY OF THE INVENTION

A method and flat face commutator in which a continuous ring of an electrically conductive metal is electrically connected and mechanically attached to a sintered carbon ring and then a housing of an electrically insulating plastic material is molded onto this subassembly. Thereafter, a plurality of circumferentially spaced apart radial grooves are cut through both the carbon ring and the metal ring to provide a commutator with a plurality of individual carbon segments permanently mounted and attached to the housing and each having a separate electrical connector adjacent the periphery of the housing.

Preferably, the metal ring is constructed so that after the radial grooves are formed only a small area of the metal is exposed in the groove. Preferably, in one form, the metal and carbon rings are electrically and mechanically interconnected by forming a green powdered carbon compact around the metal ring and sintering the carbon to bond them together. In another form, the metal and sintered carbon rings are soldered together. Preferably, the outer periphery of the carbon ring is copperized to accept solder and be securely attached to the metal ring.

Objects, features and advantages of this invention include a method and flat commutator which has a long useful life when exposed to hydrocarbon fuels, desirable low electrical resistance, high mechanical strength and stability, a relatively simple design and is extremely inexpensive and economical to manufacture and assemble, rugged, durable, reliable, and has a long useful life in service.

BRIEF DESCRIPTION OF THE DRAWINGS

These, and other objects, features and advantages of this invention will be apparent from the following detailed description of the preferred embodiments and best mode, appended claims, and accompanying drawings in which:

FIG. 6 is an end view of a sintered carbon ring and conductor ring subassembly used in making the commutator of FIG. 1;

FIG. 7 is a sectional view taken generally on line 7—7 of FIG. 6;

FIG. 8 is a sectional view of the commutator taken generally on line 8—8 of FIG. 3.

FIG. 9 is an end view of a modified flat commutator embodying this invention;

FIG. 10 is a side view of the modified commutator of FIG. 9;

FIG. 11 is a sectional view of the modified commutator taken generally on line 11—11 of FIG. 9;

FIG. 12 is a layout of a blank for a conductor ring used in making the modified commutator of FIG. 9;

DETAILED DESCRIPTION

Figure 1:
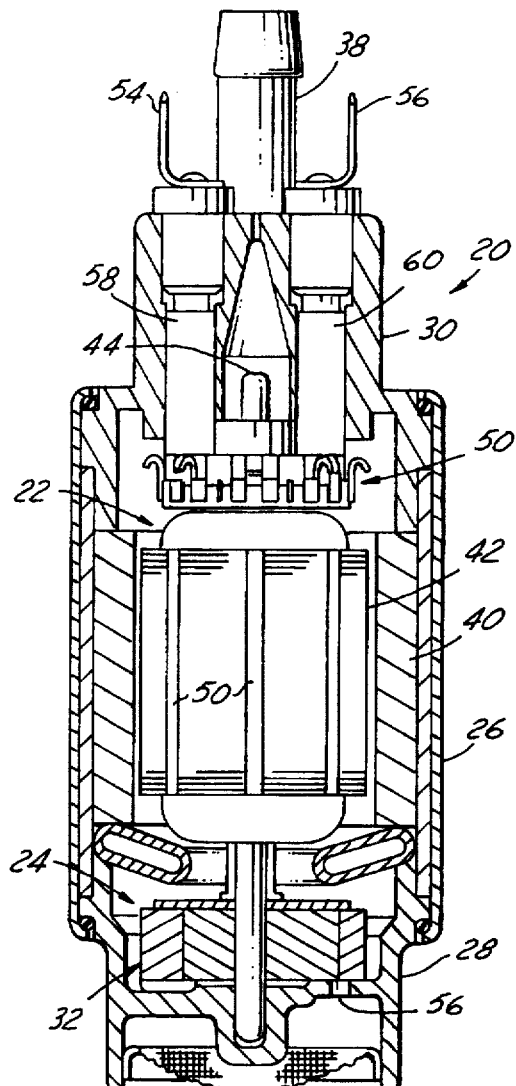
FIG. 1 is a longitudinal sectional view of a fuel pump with a first commutator embodying this invention.

FIG. 1 illustrates an electric fuel pump module 20 for an automotive vehicle which is typically mounted in a fuel tank. The module 20 has an electric motor 22 and a fuel pump 24 mounted in a case 26 and received between a fuel inlet end cap 28 and fuel outlet end cap 30. The pump has a gear and rotor assembly 32 which draws fuel from the tank through a filter 34 and an inlet port 36 and discharges fuel under pressure into the casing and through an outlet 38. The motor 22 has a permanent magnet stator 40 and an armature or rotor 42 with a mounting and drive shaft 44 and a flat commutator 50 thereon embodying this invention. To energize the motor, current is supplied to coils 52 the armature 42 through terminals 54, 56 electrically connected to brushes 58, 60 yieldably biased by springs into engagement with an end face of the commutator 50. As thus far generally described the pump module 20 is disclosed in U.S. Pat. Nos. 5,013,221; 4,948,346; and 4,596,519, the disclosures of which are incorporated herein by reference and hence the pump module will not be described in greater detail.

Figure 2:
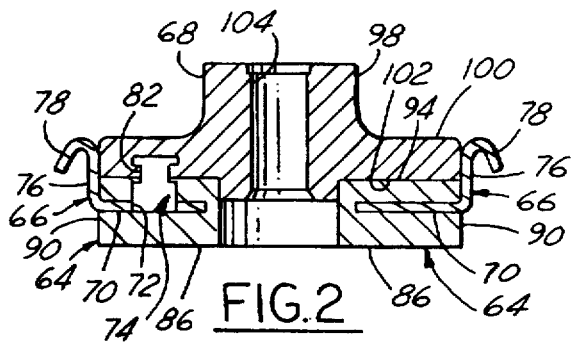
FIG. 2 is an enlarged sectional view of the commutator of FIG. 1.
Figure 3:
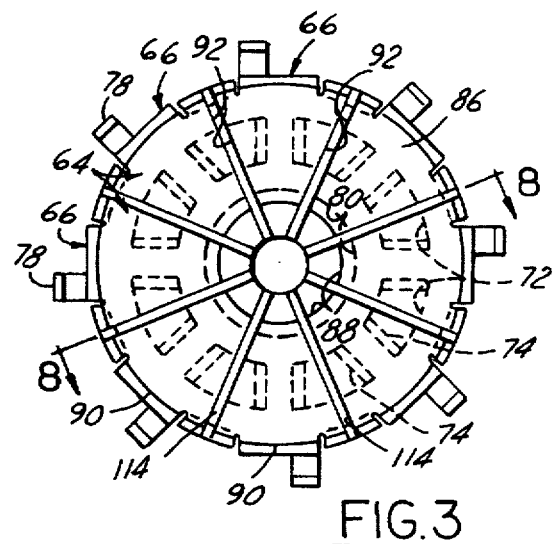
FIG. 3 is an enlarged end view of the commutator of FIG. 1.

As shown in FIGS. 1–3, the commutator 50 has a circumferential array of a plurality of individual sintered carbon segments 64 each with a conductor 66 embedded therein and mounted on a housing 68. Each conductor has a generally planar base plate 70 with a generally I-shape configuration with notches 72, integral upstanding attachment prongs 74 and adjacent its radially outer edge integral upstanding tangs 76 terminating in a generally U-shape hook 78 providing a connector for a lead wire of a armature coil 52. Preferably, the tangs 76 bear on the periphery of the carbon segments 64 and the inner edge 80 of each conductor terminates within its associated carbon segment 64. Preferably, each attachment prong 74 has a generally T shape with a head formed by a pair of generally opposed notches 82.

Each carbon segment 64 has a generally pie or trapezoidal shape with a planar outer face 86 providing a brush contact surface and is formed of sintered powdered carbon and a suitable binder with one conductor 66 embedded therein. Preferably, each segment has arcuate inner and outer walls 88, 90, planar side walls 92, and preferably a planar bottom wall 94. The conductor I-shaped base 70 with notches 72, and the upstanding prongs 74, mechanically interlock and electrically connect each sintered carbon segment with its associated conductor 66.

The housing 68 has a central hub 98 and an integral flange 100 with a shoulder 102 on which each carbon segment 64 is received and supported. The hub has a through bore 104 coaxial with the carbon segments which, when the commutator is assembled on the armature 42, is telescoped over and generally coaxial with the armature shaft 44. The mounting prongs 74 of each conductor are embedded in the housing to fixedly secure and lock its carbon segment and associated conductor thereon. The housing 68 is made of a moldable plastic electric insulating material, such as a phenolic resin.

In accordance with the method of this invention, the commutator 50 is made by forming a subassembly 108 of a one-piece sintered carbon ring 110 (FIG. 6) with a one-piece conductor ring 112 embedded therein, molding the housing 68 onto the subassembly of the carbon ring with the conductor ring embedded therein, and then cutting a plurality of equally circumferentially spaced radial grooves 114 completely through the carbon and conductor rings to form the individual sintered carbide segments 64 with one conductor 66 therein with each segment and its conductor permanently fixed to the housing.

Figure 4:
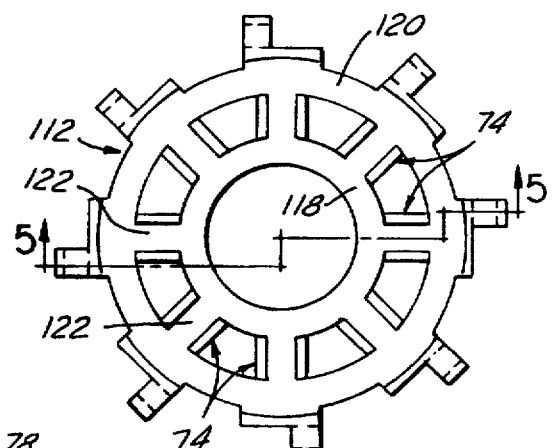
FIG. 4 is an end view of a conductor ring utilized in making the commutator of FIG. 1.
Figure 5:
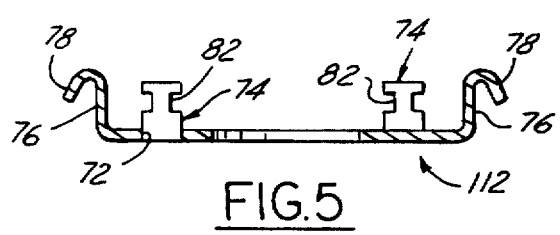
FIG. 5 is a sectional view taken generally on line 5—5 of FIG. 4 of the conductor ring.

As shown in FIGS. 4 and 5, the conductor ring 112 is a one-piece stamping of a highly conductive metal, such as copper, with concentric inner and outer annular portions 118, 120 interconnected by radial spokes 122 with upturned integral prongs 74 with notches 82 therein. A plurality of equally circumferentially spaced integral tangs 76 with return bend hooks 78 are also formed on the peripery of the outer annular portion 120. The conductor 112 ring may be formed from a blank of copper sheet metal by conventional slitting, punching, bending, coining and die stamping methods, operations, and equipment and hence will not be described in further detail.

The one-piece carbon ring 110 with the conductor ring 112 embedded therein is made by molding under pressure a compact of powdered carbon material and a binder with a conductor ring therein. A suitable carbon molding material may be a mixture of an electro graphite and a phenol binder (usually about 50%–60% by weight), which is placed in a die along with the conductor ring 112 and pressed by a force of about 30 to 40 tons at a temperature of 320° F. to 360° F. for about two minutes. The green compact is then sintered, preferably at about 1475° F. to 1500° F. for about two hours to form the sintered carbon ring with the conductor ring fixed therein and electrically connected with the sintered carbon ring. Preferably, to avoid cracking or crazing of the sintered carbon, initially the temperature is raised gradually to the sintering temperature, which is believed to both dehydrate the powdered carbon and binder mixture and avoid heat shock, which might occur if the green carbon compact was rapidly heated.

The housing 68 is then formed on the back side of the sintered carbon ring 110 with the conductor ring 112 embedded therein by injection molding in a suitable die under heat and pressure an electrically insulating plastic material, such as a phenolic resin. The molding resin also needs to be highly resistant to degradation and deterioration by immersion in the fuel with which the electric pump is used, such as gasoline, gasohol, or diesel fuel. The housing is formed by conventional plastic molding dies, equipment, methods and operations and hence the making of the housing will not be described in further detail.

After the housing 68 is molded on the carbon and conductor ring subassembly, the outer face 128 of the sintered carbon ring 110 can be turned, ground or otherwise machined, if necessary, to provide a planar brush contact surface and then the plurality of radial grooves 114 are cut completely through both the sintered carbon ring 110 and the conductor ring 112 to form the individual carbon segments 64 each with a separate conductor 66 embedded therein. As shown in FIG. 8, each groove 114 has a sufficient axial depth to cut completely through both the carbon and conductor rings and penetrate slightly into the housing to insure each carbon segment is electrically isolated from adjacent segments.

As shown in FIG. 8, most of the base plate 70 of each conductor 66 is escapsulated by its associated carbon segment and within each groove 114 only a small area of the cross members 130, 132 of the plate formed by the annular portions 118, 120 of the conductor ring is exposed in use to contact by liquid fuel in the pump. This greatly reduces the tendency of corrosion of the conductor and the buildup in the grooves of conductive deposits between adjacent segments 64 in use and thereby greatly increases the useful service life of the commutator.

The completed commutator is assembled on the motor armature, preferably by press fitting the hub bore 104 over the shaft 44 of the armature 42 so that the commutator 50 is coaxially aligned with the armature and secured thereon for rotation in unison therewith. The lead wires for each armature coil 52 are connected and soldered to the hooks 78 of the conductors 66 of the segments 64 for supplying electric power through the brushes and segments to the coils of the armature. In use, to rotate the armature, an electric current is applied to the armature coils 52 through the brushes 58, 60 which are yieldably bias into engagement with the flat face 86 of the segments 64 of the commutator 50.

MODIFIED COMMUTATOR

FIGS. 9–11 illustrate a modified commutator 140 embodying this invention with a circumferential array of a plurality of individual sintered carbon segments 142 each with an electrical connector 144 and being permanently mounted and fixed on a housing 146. Each carbon segment 142 has a generally trapezoidal or pie shaped configuration with a flat or planar brush contacting surface 86, generally arcuate inner and outer walls 88, 90, and planar side walls 92. Preferably, to facilitate mounting on the housing, each segment has a recess or shoulder 148 on the inner edge and a prominence 150 projecting from its bottom face 152 which is preferably generally planar.

Each conductor 144 has a generally rectangular and flat base plate 154 with a downturned integral mounting tab 156 adjacent its inner edge and adjacent its outer edge circumferentially spaced apart carbon segment mounting tabs 158 and between them a downturned tang 160 with a return bend forming a connector hook 78 for an armature coil lead wire. Preferably, each mounting tab 156 has a generally T-shape configuration formed by a pair of opposed notches 162. The confronting surfaces of the outer edge 90 of each carbon segment and the tabs 158 of an associated conductor are electrically connected and permanently attached together, such as by silver soldering.

The housing 146 is injection molded of a plastic insulating material on the back face of the carbon segments 142 and conductors 144 to thereby fix and permanently attach them to the housing. The housing has a central hub 164 with a through hole 166 and an integral flange 168 underlying and supporting the segments and conductors. A rib portion 170 of the hub interlocks with the shoulder 148 of each segment 142 to mechanically secure it to the housing and each segment protrusion 150 is received in a surrounding pocket 172 in the molded housing to interlock with each segment and prevent it from shifting generally radially and circumferentially with respect to the housing. The tabs 156 are embedded in the housing to thereby secure both the conductor and the outer edge of its associated carbon segment to the housing. The housing 146 in cooperation with each segment 142 embeds and encapsulates each conductor 144 between them so that in the grooves 174 between adjacent segments only an end portion 176 with a small surface area of each conductor base is exposed so that in use of the commutator it is contacted by liquid fuel. This greatly reduces corrosion and attack by the fuel and the formation of conductive deposits between adjacent segments thereby greatly increasing the useful life in service of the commutator.

Figure 13:
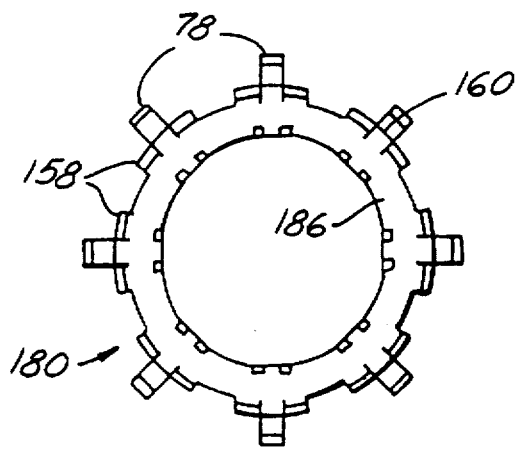
FIG. 13 is an end view of a conductor ring used in making the modified commutator of FIG. 9.
Figure 14:
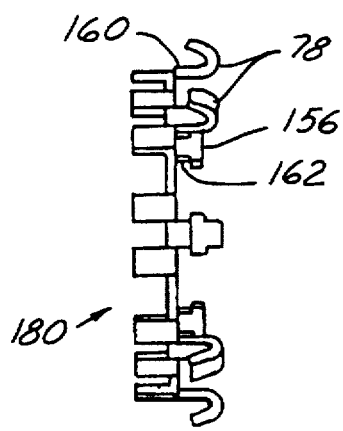
FIG. 14 is a side view of the conductor ring of FIG. 13.

In making the modified commutator 140, a one-piece conductor ring 180 is subassembled with a one-piece sintered carbon ring 182 and the housing 146 of plastic material is injection molded on the back face of the subassembly to mount and permanently fix and secure the rings to the housing. The conductor ring 180 may be formed from a ring blank 184 (FIG. 12) of copper sheet metal, by conventional metal cutting, slitting, die stamping, bending and coining equipment, methods and operations to form the complete conductor ring 180, shown in FIGS. 13 and 14. The metal blank 184 has a circumferentially continuous annular portion 186 with a plurality of circumfenentially spaced apart tabs 156' which are bent downwardly to form the mounting prongs 156 adjacent its inner periphery and adjacent its outer periphery circumferenetially spaced tabs 158' which are bent upwardly to form segment mounting tabs 158 and between them tangs 160' which are bent downwardly and with a return bend to form hooks 78 for connecting the armature coil lead wires.

Figure 15:
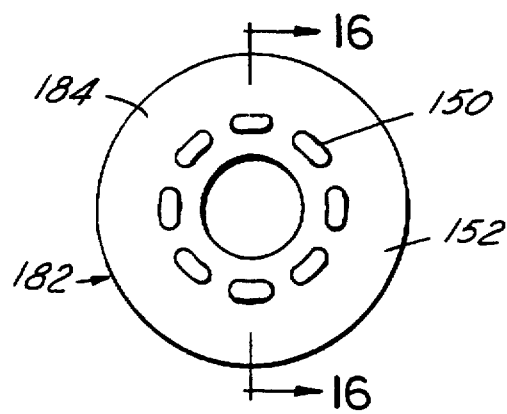
FIG. 15 is an end view of a sintered carbon ring used in making the modified commutator of FIG. 9.
Figure 16:
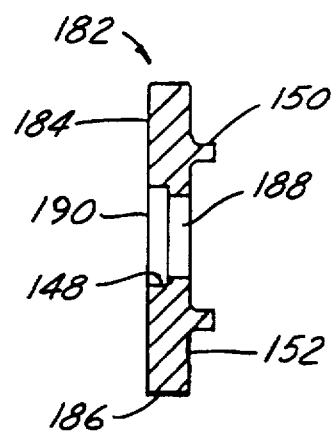
FIG. 16 is a sectional view of the sintered carbon ring taken generally on line 16—16 of FIG. 15.

As shown in FIGS. 15 and 16, the one-piece sintered carbon ring 182 has a flat end face 184, preferably a cylindrical outer periphery 186, a coaxial central bore 188 and counterbore 190 forming a shoulder 148' adjacent its inner edge. The carbon ring also has a plurality of equally circumferentially spaced apart protrusions 150 on its rear face 152 which is otherwise preferably planar and parallel to the front face 184. The sintered carbon ring 182 is made by the same method as the sintered ring 110 used in making the commutator 50. The ring 182 is made by molding in the desired shape a green compact of powdered carbon and a binder and then sintering the compact to produce the sintered carbon ring.

The conductor ring 180 is preferably pretinted on one side with solder, subassembled with the carbon ring 182 and at least the tabs 158 soldered to the carbon ring with a low temperature (400°–600° F.) melting point solder. Preferably, the conductor ring and the carbon ring are silver soldered or brazed together simultaneously with sintering of the green carbon compact to produce the sintered carbon ring. This also tends to bond the annular portion 186 of the conductor ring to the carbon ring. However, if desired, after sintering has been completed, the copper ring can be soldered or brazed to the sintered carbon ring. Preferably, at least the outer periphery of the carbon ring is copperized to facilitate soldering the tabs 158 of the conductor ring to it.

After the conductor ring 180 and the sintered carbon ring 182 have been subassembled together, the housing is injection molded onto the back face of the subassembly to mount and permanently attach the sintered carbon and conductor rings onto the housing. To securely attach them, the molded housing has an annular portion 170' which interlocks with the shoulder 148' of the carbon ring 182, pockets 172 in the flange portion which interlock with the protuberances 150 of the carbon ring, and the tabs 156 of the connector 180 ring are embedded and interlocked in the flange portion 168 of the housing.

After the housing 146 has been molded on the carbon and conductor rings, if needed, the outer face 184 the carbon ring may be machined, such as by turning or grinding, to provide the flat face 86 of the commutator segments and thereafter circumferentially spaced and radially extending grooves 174 are cut completely through both the carbon ring 182 and the underlying portion of the metal conductor ring 180 to form the individual commutator segments 142 each with a separate conductor 144.

As shown in FIG. 11, each groove 174 is of sufficient axial depth to extend completely through both the carbon and metal rings and results in only a portion 190 with a small area of each conductor 144 being exposed in the groove 174 between adjacent carbon segments which increases the in service useful life of the commutator. In the groove 174, the radial extent of the conductor portion 190 is desirably less than one-half and preferably less than one-third of the radial extent of the groove through the carbon ring. In the groove 174, the exposed surface area of the conductor portion is desirably less than one-third and preferably less than one-sixth of the surface area of its assocated carbon segment in the groove.

The completed commutator 140 is assembled on the armature 142 and used in the pump 20 in essentially the same manner as the commutator 50 and hence the assembly and use of the modified commutator 140 will not be repeated herein.

What is claimed is:

1. A commutator for an electric motor of a fuel pump which comprises: an annular ring of sintered carbon having a central axis, an inner peripheral wall, an outer peripheral wall, a planar outer face generally perpendicular to the central axis and a generally opposed back face, a metal conductor ring having a base portion underlying the planar outer face of the carbon ring and having a plurality of circumferentially spaced apart tangs extending outwardly through the outer peripheral wall of the carbon ring and forming electrical connectors and a plurality of mounting projections which are circumferentially spaced apart, disposed radially inwardly of the connector tangs and project generally axial through and beyond the back face of the carbon ring, the base portion of the connector ring being embedded in the carbon ring and between the outer and back faces of and securely attached and bonded to the carbon ring by sintering and each of its tangs electrically connected with the carbon ring, a housing of an electrically insulating plastic material molded over the carbon ring and encasing the back face of the carbon ring with the mounting projections of the conductor ring embedded and interlocked in the housing, the housing having a through bore coaxial with the central axis of the carbon ring, and a plurality of equally circumferentially spaced apart grooves each extending radially and axially completely through the carbon ring and the metal conductor ring embedded therein and forming a plurality of spaced apart separate sintered carbon segments each with a separate electrical conductor embedded and bonded therein by sintering to serve as commutator segments for contact with resiliently biased brushes with the grooves being formed only after the housing has been molded onto the back face of the carbon ring to permanently fix and secure each of the carbon segments of the carbon ring to the housing.

2. The commutator of claim 1 wherein each groove has a pair of generally opposed faces of the carbon ring, a portion of the conductor ring is exposed in each face of each groove and the radial extent of each such exposed portion of the conductor ring is less than one half of the radial extent of its associated groove through the carbon ring.

3. The commutator of claim 1 wherein each groove has a pair of generally opposed faces of the carbon ring, a portion of the conductor ring is exposed in each face of each radial groove and each such exposed portion of the conductor ring has a surface area which is less than 1/15 of the surface area of its associated face of its associated groove.

4. The commutator of claim 1 which also comprises a plurality of circumferentially spaced apart tabs integral with and adjacent the outer edge of the conductor ring and extending generally axially in overlapping relationship with the outer peripheral wall of the carbon ring and soldered to the outer peripheral wall of the carbon ring so that each tab is electrically connected to only one carbon segment of the commutator and with an associated tang.

5. The commutator of claim 1 wherein the carbon ring has a shoulder adjacent its radially inner peripheral wall and the housing has an integral portion extending into said shoulder and interlocked therewith to retain the carbon segments on the housing.

6. The commutator of claim 5 wherein the carbon ring has a plurality of circumferentially spaced apart integral projections extending from the back face of the carbon ring which are embedded in the housing to radially and circumferentially retain the carbon segments on the housing.

7. The commutator of claim 1 wherein the carbon ring has a plurality of circumferentially spaced apart integral projections extending from the back face of the carbon ring which are embedded in the housing to radially and circumferentially retain the carbon segments on the housing.

8. The commutator of claim 1 wherein the housing has an integral annular portion projecting into and bearing on the inner peripheral wall of the carbon ring.

9. The commutator of claim 1 in which the conductor ring has a plurality of generally axially extending tabs which are circumferentially spaced apart and bear on the outer peripheral wall of the carbon ring and are bonded by sintering to the carbon ring so that each tab is in contact with only one carbon segment of the commutator and with an associated tang.

10. The commutator of claim 1 in which the conductor ring is secured to the carbon ring by embedding the base portion of the conductor ring in the molded carbon ring before it is sintered to form the sintered carbon ring with the conductor ring embedded therein and adhered thereto with its mounting tabs projecting through the back face of the sintered carbon ring.

11. A commutator for an electric motor of a fuel pump which comprises: an annular ring of sintered carbon having a central axis, an inner peripheral wall, an outer peripheral wall, a planar outer face generally perpendicular to the central axis, and a generally opposed inner face, a conductor ring having a base portion embedded in the carbon ring between the inner and outer faces and underlying the planar outer face of the carbon ring and bonded to the carbon ring by sintering and having a plurality of circumferentially spaced apart tangs extending outwardly through the outer peripheral wall of the carbon ring and forming electrical connectors, a housing of an electrically insulating plastic material molded over the carbon ring, encasing the back face of the carbon ring and overlapping the inner peripheral wall of the carbon ring, the housing having a through bore coaxial with the central axis of the carbon ring and encircled by the carbon ring, and a plurality of equally circumferentially spaced apart grooves each extending radially and axially completely through the carbon ring and the metal conductor ring embedded therein and forming a plurality spaced apart separate sintered carbon segments each with a separate electrical conductor embedded therein to serve as commutator segments for contact with resiliently biased brushes with the grooves being formed only after the housing has been molded onto the carbon ring to permanently fix and secure each of the carbons segments of the carbon ring to the housing.

12. The commutator of claim 11 wherein each groove has a pair of generally opposed faces of the carbon ring, a portion of the conductor ring is exposed in each face of each groove and the radial extent of each such exposed portion of the conductor ring is less than one-half of the radial extent of its associated groove through the carbon ring.

13. The commutator of claim 11 wherein each groove has a pair of generally opposed faces of the carbon ring, a portion of the conductor ring is exposed in each face of each radial groove and each such exposed portion of the conductor ring has a surface area which is less than 1/15 of the surface area of its associated face of its associated groove.

14. The commutator of claim 11 wherein the base portion of the conductor ring is embedded in the carbon ring before it is sintered to form the sintered carbon ring with the conductor ring secured therein.

15. The commutator of claim 11 which also comprises an annular shoulder adjacent the inner peripheral wall of the carbon ring and the housing is molded with an integral annular portion engaging the shoulder to secure the carbon ring on the housing.

* * * * *

UNITED STATES PATENT AND TRADEMARK OFFICE
CERTIFICATE OF CORRECTION

PATENT NO  :  5,793,140
DATED      :  August 11, 1998
INVENTOR(S):  J. D. Tuckey It is certified that error appears in the above-identified patent and that said Letters Patent is hereby corrected as shown below:

Col 7, Line 18, change "1/15" to -- 1/5 --.

Col 8, Line 24, after "plurality" insert -- of --.

Col 8, Line 42, change "1/15" to -- 1/5 --.

Signed and Sealed this

Ninth Day of February, 1999

Attest:

Attesting Officer

*Acting Commissioner of Patents and Trademarks*